United States Patent
Benisty et al.

(10) Patent No.: US 11,086,804 B2
(45) Date of Patent: Aug. 10, 2021

(54) STORAGE SYSTEM AND METHOD FOR REDUCING READ-RETRY DURATION

(71) Applicant: Western Digital Technologies, Inc., San Jose, CA (US)

(72) Inventors: Shay Benisty, Beer Sheva (IL); Judah Gamliel Hahn, Ofra (IL); Alexander Bazarsky, Holon (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/708,006

(22) Filed: Dec. 9, 2019

(65) Prior Publication Data
US 2021/0173795 A1 Jun. 10, 2021

(51) Int. Cl.
*G06F 13/16* (2006.01)

(52) U.S. Cl.
CPC ................................ *G06F 13/1668* (2013.01)

(58) Field of Classification Search
CPC .................................................. G06F 13/1668
See application file for complete search history.

(56) References Cited

U.S. PATENT DOCUMENTS

| | | | |
|---|---|---|---|
| 5,809,260 A | 9/1998 | Bredin | |
| 6,321,296 B1 | 11/2001 | Pescatore | |
| 6,366,980 B1* | 4/2002 | Haines | G06F 3/0613 348/E5.002 |
| 6,523,142 B1* | 2/2003 | Igari | G06F 3/061 711/114 |
| 6,920,281 B1 | 7/2005 | Agnibotri et al. | |
| 8,260,954 B2* | 9/2012 | Ng | H04L 67/02 709/236 |
| 8,495,301 B1* | 7/2013 | Alexander | G06F 13/28 711/118 |
| 8,671,296 B2* | 3/2014 | Yoshida | G06F 3/0634 713/320 |
| 9,274,892 B2 | 3/2016 | Tsern et al. | |
| 9,400,657 B2 | 7/2016 | Busaba et al. | |
| 2002/0038406 A1* | 3/2002 | Shirai | G11B 19/04 711/137 |
| 2002/0110353 A1 | 8/2002 | Potrebic et al. | |

(Continued)

FOREIGN PATENT DOCUMENTS

KR 10-2008-0044616 A 5/2008

OTHER PUBLICATIONS

International Search Report dated Aug. 26, 2020 for International Application No. PCT/US2020/024635.

(Continued)

*Primary Examiner* — Henry Tsai
*Assistant Examiner* — Aurangzeb Hassan
(74) *Attorney, Agent, or Firm* — Brinks Gilson & Lione

(57) ABSTRACT

A storage system and method for reducing read-retry duration are provided. In one embodiment, a storage system is provided comprising a memory and a controller. The controller is configured to: receive a command from a host; and in response to an interruption in processing of the command: select a time for the host to retry the command, wherein the time is selected based on an expected host response time; and communicate the selected time to the host. Other embodiments are provided.

19 Claims, 6 Drawing Sheets

(56) References Cited

U.S. PATENT DOCUMENTS

| | | | |
|---|---|---|---|
| 2004/0158865 A1* | 8/2004 | Kubler | H04N 21/41415 |
| | | | 725/82 |
| 2004/0199511 A1 | 10/2004 | Fujisawa et al. | |
| 2008/0082866 A1* | 4/2008 | Li | G06F 11/221 |
| | | | 714/43 |
| 2009/0164607 A1* | 6/2009 | Clark | H04L 63/105 |
| | | | 709/219 |
| 2009/0327854 A1* | 12/2009 | Chhajer | G06F 16/217 |
| | | | 715/227 |
| 2012/0179860 A1 | 7/2012 | Falanga et al. | |
| 2015/0006663 A1* | 1/2015 | Huang | G06F 13/00 |
| | | | 709/213 |
| 2016/0249012 A1 | 8/2016 | Wang et al. | |
| 2017/0286324 A1* | 10/2017 | Taki | G06F 11/076 |
| 2019/0205244 A1* | 7/2019 | Smith | G06F 12/12 |
| 2019/0347125 A1* | 11/2019 | Sankaran | G06F 9/4881 |
| 2020/0036596 A1* | 1/2020 | Panda | G06F 11/3433 |
| 2020/0065031 A1* | 2/2020 | Kim | G11C 16/22 |
| 2020/0272528 A1* | 8/2020 | Klein | G06F 9/4818 |

OTHER PUBLICATIONS

Written Opinion dated Aug. 26, 2020 for International Application No. PCT/US2020/024635.

\* cited by examiner

STORAGE SYSTEM AND METHOD FOR REDUCING READ-RETRY DURATION

BACKGROUND

NVM Express (NVMe) is a standard for accessing non-volatile storage media attached via a PCI Express (PCIe) bus. NVMe may be used with a variety of non-volatile storage media, such as solid state drives (SSDs). One focus of NVMe relates to input/output communication between a host device (which may access and/or write to the non-volatile storage media) and a storage system (which includes the non-volatile storage media).

DETAILED DESCRIPTION

Overview

Figure 1A:
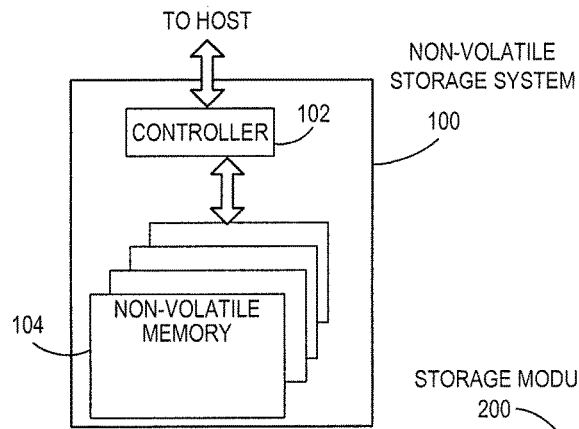
FIG. 1A is a block diagram of a non-volatile storage system of an embodiment.

By way of introduction, the below embodiments relate to a storage system and method for reducing read-retry duration. In one embodiment, a storage system is provided comprising a memory and a controller. The controller is configured to: receive a command from a host; and in response to an interruption in processing of the command: select a time for the host to retry the command, wherein the time is selected based on an expected host response time; and communicate the selected time to the host.

In some embodiments, the expected host response time is based on statistics of when the host retried prior commands that have been interrupted.

In some embodiments, the controller is further configured to update the statistics based on when the host actually retries the command.

In some embodiments, the expected host response time is calculated based on one or more of the following: whether the host initiated a retry command for a prior command that was interrupted, time elapsed between when the storage system previously communicated a selected time to the host and when the host actually retried the command, an environment in which a prior command was interrupted, an operation mode in which the host retried a prior command that was interrupted, available free memory space, and age of the memory.

In some embodiments, the time is selected from a group of predetermined command retry delay timing values.

In some embodiments, the controller is further configured to communicate the selected time to the host by placing the selected time in a completion queue.

In some embodiments, the memory comprises a three-dimensional memory.

In some embodiments, the storage system is configured to be integrated in the host.

In some embodiments, the storage system is configured to be removably connected with the host.

In another embodiment, a method for reducing read-retry duration is presented that is performed in a storage system in communication with a host. The method comprises: gathering statistics on host response time to prior requests from the storage system for the host to retry aborted commands; aborting a command; and requesting the host retry the aborted command at a specified time, wherein the specified time is chosen based on the gathered statistics.

In some embodiments, the method further comprises updating the statistics based on when the host retries the aborted command.

In some embodiments, the gathered statistics comprise one or more of the following: whether the host initiated a retry command for a prior command that was interrupted, time elapsed between when the storage system previously communicated a selected time to the host and when the host actually retried the command, an environment in which a prior command was interrupted, an operation mode in which the host retried a prior command that was interrupted, available free memory space, and age of the memory.

In some embodiments, the specified time is selected from a group of predetermined command retry delay timing values.

In some embodiments, the specified time is requested by placing the specified time in a completion queue.

In another embodiment, a storage system is provided comprising a memory and means for determining when the storage system should request that a host retry an aborted command based on how the host responded to previous requests from the storage system to retry aborted commands.

In some embodiments, the expected host response time is based on statistics of when the host retried prior commands that have been aborted.

In some embodiments, the means for determining comprises means for selecting a time from a group of predetermined command retry delay timing values.

In some embodiments, the memory comprises a three-dimensional memory.

In some embodiments, the storage system is configured to be integrated in the host.

In some embodiments, the storage system is configured to be removably connected with the host.

Other embodiments are possible, and each of the embodiments can be used alone or together in combination. Accordingly, various embodiments will now be described with reference to the attached drawings.

Embodiments

Figure 1B:
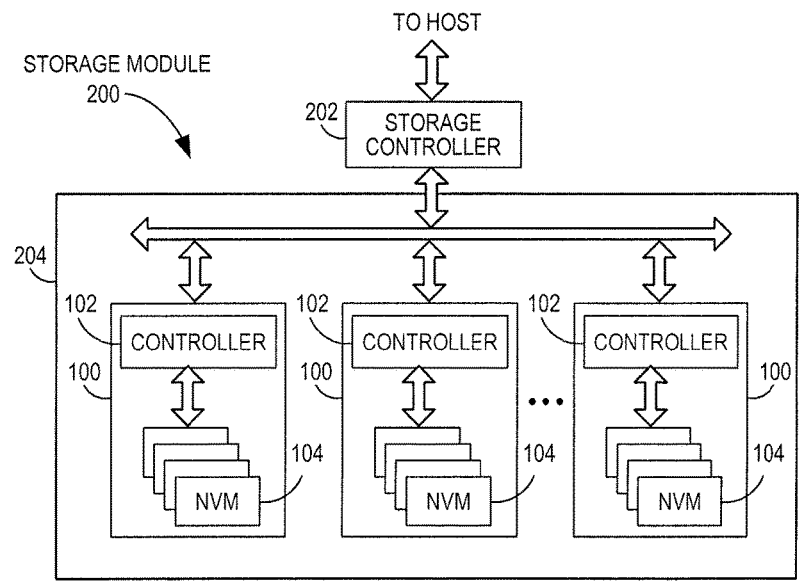
FIG. 1B is a block diagram illustrating a storage module of an embodiment.
Figure 1C:
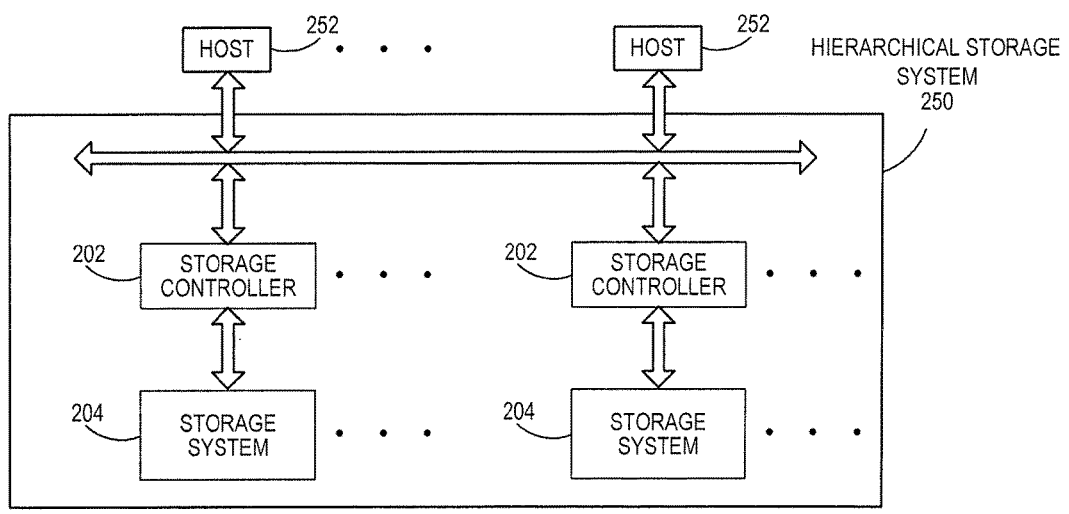
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
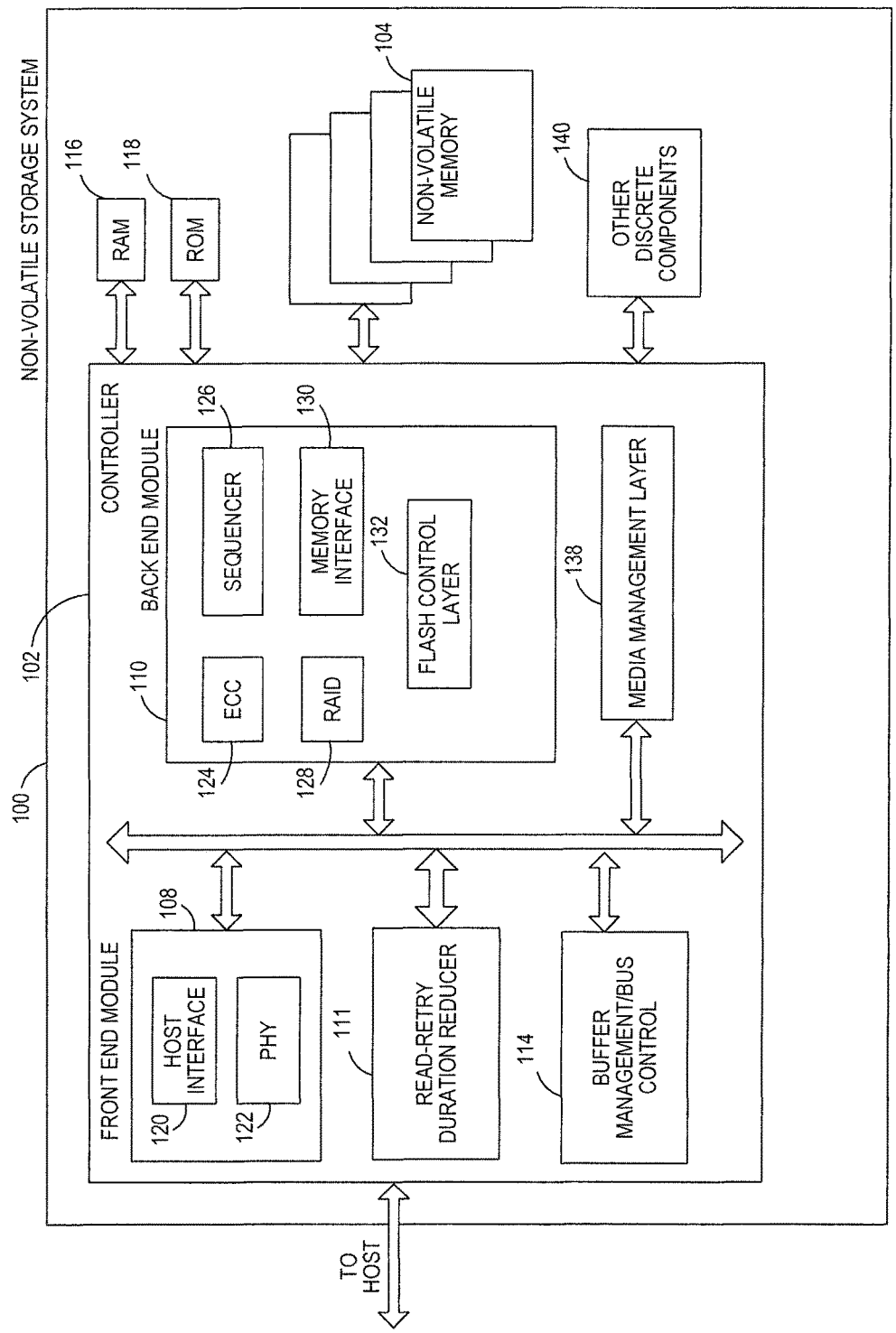
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a read-retry duration reducer 111, which is discussed in more detail below, and can be implemented in hardware or software/firmware. The read-retry duration reducer 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
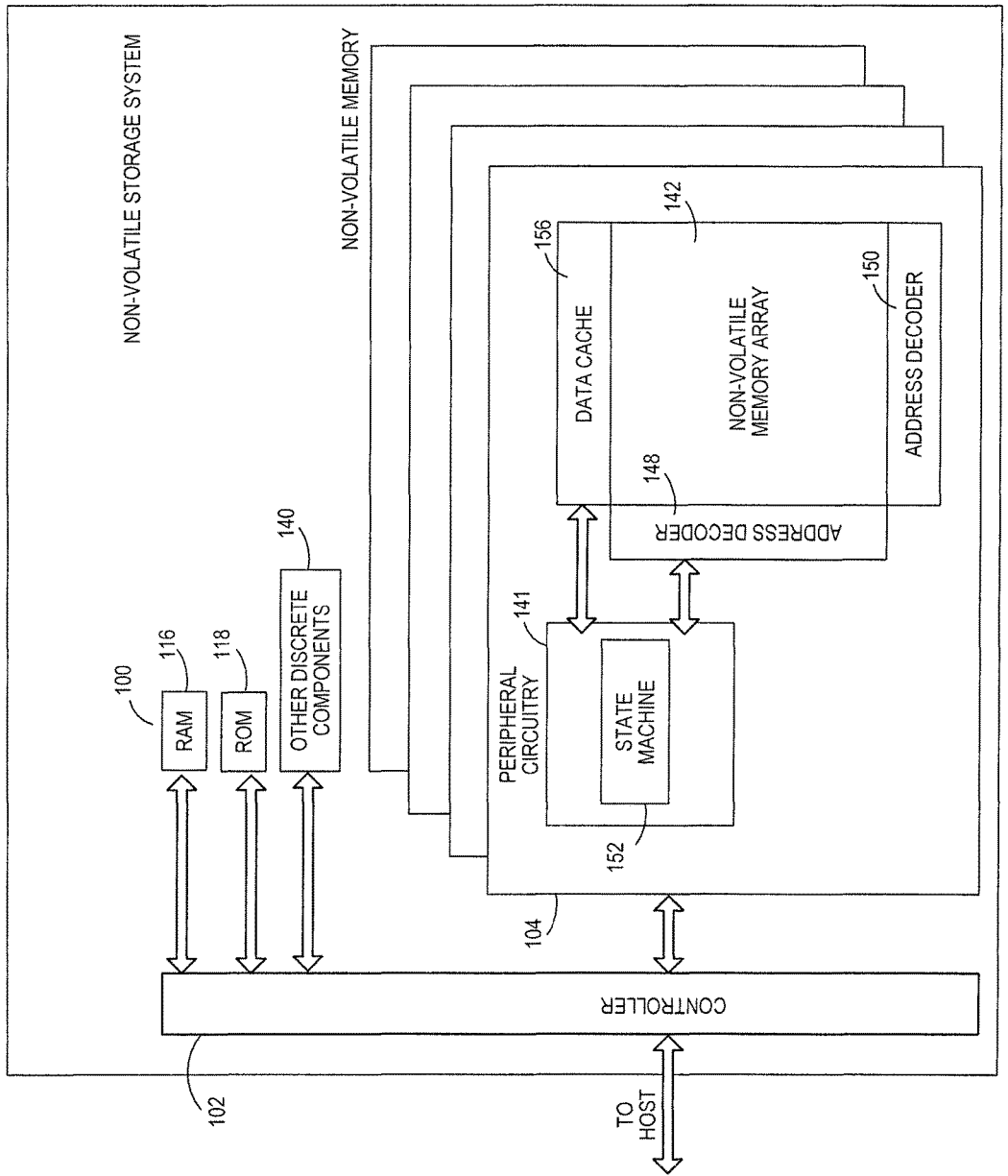
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

The storage system (sometimes referred to herein as the storage device or device) 100 can be used with any suitable protocol or specification. One such specification is the Non-Volatile Memory Express (NVMe) specification. NVMe is based on a paired submission queue (SQ) and completion queue (CQ). The host, using host software, places commands into a respective submission queue. The memory device 100, via the memory device controller 102, places entries on the associated completion queue, with the entries indicative of completed execution of commands.

One feature of the current NVMe standard is Advanced Command Retry (ACR). When the ACR feature is supported and enabled, the storage system's controller 102 may interrupt a command by aborting it and providing the host with an indication of the timeframe to retry the command. At the NVMe initialization phase, the storage system's controller 102 advertises three levels of Command Retry Delay Timing (CRDT) values in granularity of 100 milliseconds as a response to an identify command. The below portion of the NVMe specification presents the relevant fields of the Identify command data structure, and CRDT1, CRDT2, and CRDT3 hold the three levels of Command Retry delay timing:

| Bytes | O/M[1] | Description |
|---|---|---|
| 127:112 | O | FRU Globally Unique Identifier (FGUID): This field contains a 128-bit value that is globally unique for a given Field Replaceable Unit (FRU). Refer to the NVM Express™ Management Interface (NVMe-MI™) specification for the definition of a FRU. This field remains fixed throughout the life of the FRU. This field shall contain the same value for each controller associated with a given FRU.<br>This field uses the EUI-64 based 16-byte designator format. Bytes 122:120 contain the 24-bit Organizationally Unique Identifier (OUI) value assigned by the IEEE Registration Authority. Bytes 127:123 contain an extension identifier assigned by the corresponding organization. Bytes 119:112 contain the vendor specific extension identifier assigned by the corresponding organization. Refer to the IEEE EUI-64 guidelines for more information. This field is big endian (refer to section 7.10). When not implemented, this field contains a value of 0 h. |

-continued

| Bytes | O/M[1] | Description |
|---|---|---|
| 129:128 | O | Command Retry Delay Time 1 (CRDT1): If the Do Not Retry (DNR) bit is cleared to '0' in the CQE and the Command Retry Delay (CRD) field is set to 01b in the CQE, then this value indicates the command retry delay time in units of 100 milliseconds. |
| 131:130 | O | Command Retry Delay Time 2 (CRDT2): If the DNR bit is cleared to '0' in the CQE and the CRD field is set to 10b in the CQE, then this value indicates the command retry delay time in units of 100 milliseconds. |
| 133:132 | O | Command Retry Delay Time 3 (CRDT3): If the DNR bit is cleared to '0' in the CQE and CRD field is set to 11b in the CQE, then this value indicates the command retry delay time in units of 100 milliseconds. |

During NVMe operations, the host queues commands to the storage system 100. The storage system 100 executes the commands and completes them by posting a single completion queue entry to each one of them. The completion queue entry indicates the status of the completed command (e.g., completed successfully or with error). NVMe 1.4 defines a completion status called "Command Interrupted," as reproduced below:

21 h Command Interrupted: Command processing was interrupted and the controller is unable to successfully complete the command. The host should retry the command.
If this status code is returned, then the controller shall clear the Do Not Retry bit to '0' in the Status field of the CQE (refer to FIG. 124). The controller shall not return this status code unless the host has set the Advanced Command Retry Enable (ACRE) field to 1 h in the Host Behavior Support feature (refer to section 5.21.1.22).

When this status bit is set, the command processing was interrupted, and the storage system 100 is unable to successfully complete the command. The host may retry the execution of the command. When the command is interrupted, the storage system's controller 102 may specify the command retry delay by classifying this command with one of the three advertised supported command retry delay timings. This indication is posted to the host via a command completion, as reproduced from the NVMe standard below:

29:28 Command Retry Delay (CRD): If the DNR bit is cleared to '0' and the host has set the Advanced Command Retry Enable (ACRE) field to 1 h in the Host Behavior Support feature (refer to section 5.21.1.22), then:
 a) a zero CRD value indicates a zero command retry delay time (i.e., the host may retry the command immediately); and
 b) a non-zero CRD value selects a field in the Identify Controller data structure (refer to FIG. 247) that indicates the command retry delay time:
  a 01b CRD value selects the Command Retry Delay Time 1 (CRDT1) field;
  a 10b CRD value selects the Command Retry Delay Time 2 (CRDT2) field; and
  a 11b CRD value selects the Command Retry Delay Time 3 (CRDT3) field.
The host should not retry the command until at least the amount of time indicated by the selected field has elapsed. It is not an error for the host to retry the command prior to that time.
If the DNR bit is set to '1' in the Status field or the ACRE field is cleared to 0 h in the Host Behavior
Support feature, then this field is reserved.
If the SCT and SC fields are cleared to 0 h, then this field should be cleared to 0 h.

Figure 3:
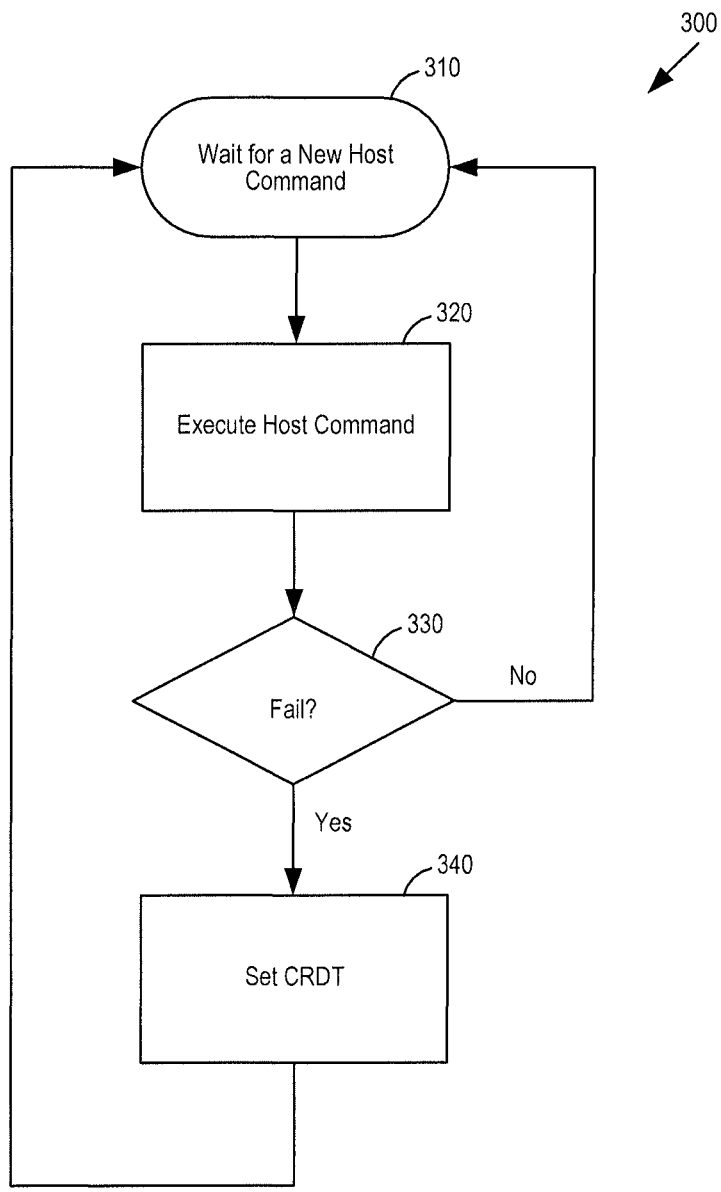
FIG. 3 is a flow chart of a method of an embodiment for processing an Advanced Command Retry command.

FIG. 3 is a flow chart 300 of a method of an embodiment for processing an Advanced Command Retry command. As shown in FIG. 3, the storage system 100 awaits a new host command (act 310). When the storage system 100 gets a new host command, it attempts to execute it (act 320) and determines if the attempt was successful (act 330). If the attempt to execute the command was successful, the storage system 100 awaits a new host command (act 310). However, if the attempt to execute the command failed, the storage system 100 sets the Command Retry Delay Timing (CRDT) parameter (act 340) and awaits a new host command (act 310). In this way, the storage system 100 sets the CRDT in response to the current failure only according to the failing page attributes (e.g., estimated bit error rate (BER)) and the other associated memory conditions.

This usage of the Advanced Command Retry (ACR) feature is based on processing each command separately, without allowing storage system preparation for associated retry future commands. The following embodiments provide an ACR accelerator by gathering statistics on the expected host response to previous ACR failure events. In one embodiment, the storage system 100 initiates preceding commands according to gathered statistics, so that in cases where there is a high probability for a successive retry operation following an ACR failure, the storage system's preceding response will allow a lower latency for the successive read commands. In this way, the following embodiments disclose a statistical method for reducing read retry duration by taking advantage of the command interrupted feature such that the overall system performance and quality of service can be increased.

Figure 4:
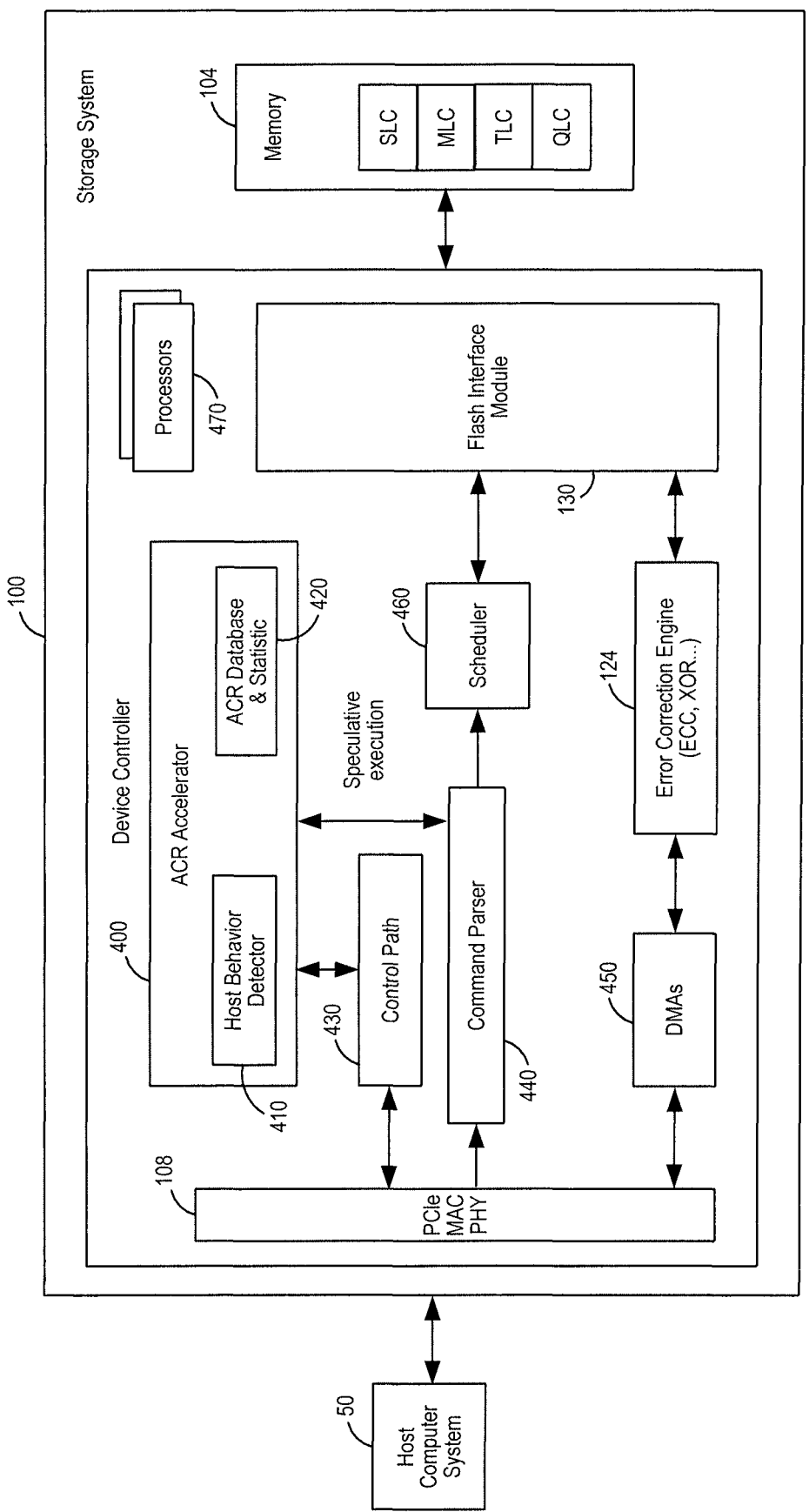
FIG. 4 is a block diagram of a host computer system and storage system of an embodiment.

Returning to the drawings, FIG. 4 is an illustration of one particular implementation of a host computer system (host) 50 and storage system 100 that can be used to implement these embodiments. It should be noted that this is just an example, and other implementations can be used. For example, while FIG. 4 shows some components that are similar to those shown in FIG. 2A and also shows some additional components, other implementations of the controller 102 can be used.

The host 50 can take any suitable form, such as, but not limited to, a personal computer, a mainframe computer, a server, or other computing device. The host 50 communicates with the storage system 100 using one or more busses. The bus communicates between a storage system interface (not shown) in the host 50 and the PCIe MAC PHY 108 in the controller 102 of the storage system 100. "PHY" is an abbreviation for the physical layer and refers to the circuitry used to implement physical layer functions. The PHY can connect a link layer device called a MAC (media access control) to a physical medium, such as a wire, cable, or fiber. There are many protocols defined in the industry for this interface, such as, but not limited to, Peripheral Component Interconnect Express (PCIe), SATA, and NVMe. The MAC and PHY 122 can implement three low protocol layers (Transaction layer, Data Link layer, and Physical layer).

While the MAC PHY 108 is the interface between the controller 102 and the host 50, the flash interface module 130 is the interface between the controller 102 and the memory arrays 104. In general, the flash interface module (FIM) 130 is responsible for low-level interaction with the memory 104, which can include, for example, single level memory cells (SLC), multi-level memory cells (MLC), triple-level memory cells (TLC), and quad-level memory cells (QLC). While flash is used in this example, it should be noted that other memory technologies can be used, which is why FIG. 2A refers to a "memory interface" 130 instead of the more specific "flash interface module."

As shown in FIG. 4, there are several components between the MAC PHY 108 and the flash interface module 130. In this embodiment, those components include an ACR accelerator 400 (also referred to above as the read-retry duration reducer 111) having a host behavior detector 410 and an ACR database & statistic module 420, a control path 430, a command parser 440, direct memory access modules (DMAs) 450, a scheduler 460, processors 470, and an error correction module 124. Again, this is just an example implementation, and other implementations can be used. Component(s) in the controller 102 can form a command processing path. As used herein, a "command processing path" can refer to one or more components in the controller 102 that are used to process a command, and a pipeline stage can refer to one of these components.

The command parser 440 is responsible for fetching and parsing the commands from the host 50 and internally queuing them. For example, the command parser 440 can receive a command, parses it, and check the correctness of the command. The command parser 440 can also be responsible for controlling the flow of data between the controller 102 and the memory 104 by ordering requests or commands in a queue. The order may be based on priority of the request, availability of resources to handle the request, an address needed for the request, the age of the request, or access history of the requestor. In this way, the queue can be used to enable the delay of command execution, either in order of priority, on a first-in first-out basis, or in any other order. Instead of waiting for each command to be executed before sending the next one, the command parser 440 can just put the commands in the queue and can perform other processes while the queue is executed. In operation, the command parser 440 gets commands from the host 50, makes sure the command is ok, and can classify the command as a read or write command.

The scheduler 460 is responsible for scheduling data transfers and control paths and for arbitrating and executing commands. For example, read data might arrive from different memory arrays in parallel. The scheduler 460 can arbitrate between them and activate the DMAs 450, which are responsible for the data transfer between the host 50 and memory 104.

The error correction module 124 is responsible for error detection and correction and can decode and encode data read from and written to the memory 104. The control path 430 is responsible for the control handshake with the host 50. The processors 470 are responsible for the execution of front-end and back-end tasks.

As mentioned above, in this embodiment, the storage system 100 comprises an ACR accelerator 400, which has a host behavior detector 410 and an ACR database & statistic module 420. In general, the ACR accelerator 400 gathers statistics in the database 420 by monitoring the response of the host 50 to ACR failure. The ACR accelerator 400 can also consider the Command Retry Delay (CRD) time (the elapsed time expected by the storage system 100 before another attempt is made). The recorded data may involve the some or all following features (or other features) per supplied Command Retry Delay Timing (CRDT) (1,2,3):
  whether the host initiates a retry command (0/1)
  the time elapsed between issuing the ACR and the actual host retry in case of retry
  the environment in which ACR occurred (random read/sequential read/stream detected)
  the operation mode in which the host 50 sends the retry command (separate/clustered with more commands)
  memory-related data, such as the available free space and device age During the inference process, based on these features, the storage system 100 may decide whether and when to pre-process the memory page in question that failed and resulted the ACR event. The storage system 100 may perform operations (such as read threshold calibration, read with soft bits, and exclusive or (XOR) recovery) based on the severity of the estimated bit error rate (BER) and other properties (such as device age and environment conditions (e.g., data retention based on device temperature).

Figure 5:
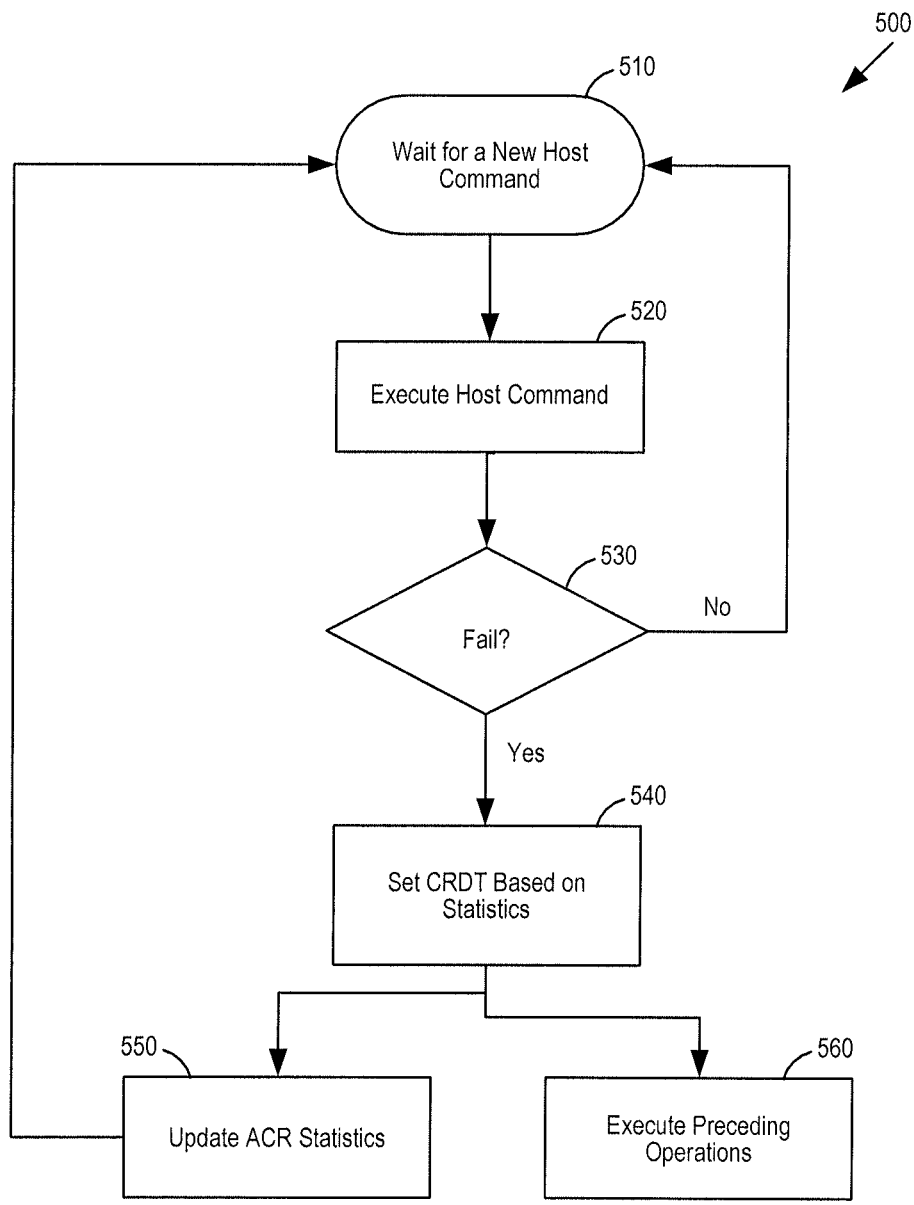
FIG. 5 is a flow chart of a method of an embodiment for using a statistical method to reduce read retry duration.

Returning to the drawings, FIG. 5 is a flow chart 500 of a method of an embodiment for using a statistical method to reduce read retry duration. As shown in FIG. 5, the storage system 100 awaits a new host command (act 510). When the storage system 100 gets a new host command, it attempts to execute it (act 520) and determines if the attempt was successful (act 530). If the attempt to execute the command was successful, the storage system 100 awaits a new host command (act 510). However, if the attempt to execute the command failed, the storage system 100 sets the Command Retry Delay Timing (CRDT) parameter based on the gathered statistics (act 540). Here, the CRDT returned to the host 50 is a function of the analysis that also indicates the optimal CRDT times in view of the other activities the storage system 100 conducting and the host's inclination. The storage system 100 then updates the ACR statistics in the ACR accelerator block 400 (act 550) and executes the preceding operation according to the host's past behavior, as inferred from the stored statistics and the current system status (act 560). For example, if the host 50 tends to follow up the ACR as instructed by the storage system 100 in CRDT, the preceding operations will be completed in the time indicated in CRDT. On the other hand, if the host 50 tends to ignore the ACR (probably acquiring the data elsewhere or discarding it altogether), no preceding operations will be conducted. This can be calibrated per host according to its past operations.

There are several advantages associated with these embodiments. For example, these embodiments can take advantage of the Advanced Command Retry feature of the NVMe specification by accelerating operations only when detecting that the host 50 uses the Advanced Command Retry feature. This can improve the quality of service and performance of the storage system 100 in specific scenarios while with minimal effort. These embodiments also save the storage system 100 the effort of trying if it is predicted that no retry will be initiated.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
  receive a command from a host; and
  in response to an interruption in processing of the command:
    select a time for the host to retry the command, wherein the host retried prior commands that have been interrupted and the time is selected based on a history of how long it took the host to retry the prior commands that were interrupted; and
    communicate the time to the host.

2. The storage system of claim 1, wherein the time is selected based on statistics of when the host retried prior commands that have been interrupted.

3. The storage system of claim 2, wherein the controller is further configured to update the statistics based on when the host actually retries the command.

4. The storage system of claim 1, wherein the time is selected from a group of predetermined command retry delay timing values.

5. The storage system of claim 1, wherein the controller is further configured to communicate the time to the host by placing the time in a completion queue.

6. The storage system of claim 1, wherein the memory comprises a three-dimensional memory.

7. The storage system of claim 1, wherein the storage system is configured to be integrated in the host.

8. The storage system of claim 1, wherein the storage system is configured to be removably connected with the host.

9. The storage system of claim 1, wherein the time is selected based on time elapsed between when the storage system previously communicated a time to the host and when the host actually retried a prior command.

10. The storage system of claim 1, wherein the time is selected based on an environment in which a prior command was interrupted.

11. The storage system of claim 1, wherein the time is selected based on an operation mode in which the host retried a prior command that was interrupted.

12. The storage system of claim 1, wherein the time is selected based on available free memory space.

13. The storage system of claim 1, wherein the time is selected based on age of the memory.

14. A method for reducing read-retry duration, the method comprising:
performing the following in a storage system in communication with a host:
  gathering statistics on host response times to prior requests from the storage system for the host to retry aborted commands, wherein the host retried prior commands that have been aborted and the gathered statistics comprise elapsed times between when the storage system requested the host retry the prior aborted commands and when the host actually retried the prior aborted commands;
  aborting a command; and
  requesting the host retry the aborted command at a specified time, wherein the specified time is chosen based on the gathered statistics.

15. The method of claim 14, further comprising updating the statistics based on when the host retries the aborted command.

16. The method of claim 14, wherein the specified time is selected from a group of predetermined command retry delay timing values.

17. The method of claim 14, wherein the specified time is requested by placing the specified time in a completion queue.

18. The method of claim 14, wherein the gathered statistics comprise one or more of the following: time elapsed between when the storage system previously communicated a time to the host and when the host actually retried a prior command, an environment in which a prior command was aborted, an operation mode in which the host retried a prior command that was ab aborted, available free memory space, and age of the memory.

19. A storage system comprising:
a memory; and
means for determining a time the storage system should request that a host retry an aborted command, wherein the host initiated retry commands for prior commands that have been aborted and the time is based on a history of how long it took the host to retry the prior aborted commands.

* * * * *